United States Patent
Wang (10) Patent No.: US 9,841,613 B2
(45) Date of Patent: Dec. 12, 2017

(54) EYEGLASS OF 3D GLASSES AND FABRICATION METHOD THEREOF, AND 3D GLASSES

(71) Applicants: BOE TECHNOLOGY GROUP CO., LTD., Beijing (CN); BEIJING BOE DISPLAY TECHNOLOGY CO., LTD., Beijing (CN)

(72) Inventor: Junwei Wang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 36 days.

(21) Appl. No.: 14/429,543

(22) PCT Filed: May 29, 2014

(86) PCT No.: PCT/CN2014/078855
§ 371 (c)(1),
(2) Date: Mar. 19, 2015

(87) PCT Pub. No.: WO2015/109719
PCT Pub. Date: Jul. 30, 2015

(65) Prior Publication Data
US 2016/0018672 A1 Jan. 21, 2016

(30) Foreign Application Priority Data
Jan. 24, 2014 (CN) .......................... 2014 1 0035834

(51) Int. Cl.
G02F 1/1335 (2006.01)
G02F 1/1333 (2006.01)
(Continued)

(52) U.S. Cl.
CPC ........ *G02C 7/083* (2013.01); *B29D 11/00028* (2013.01); *B29D 11/0073* (2013.01);
(Continued)

(58) Field of Classification Search
CPC ................ G02B 27/26; G02B 27/2214; G02B 27/0172; G02B 2027/0178;
(Continued)

(56) References Cited

U.S. PATENT DOCUMENTS 4,572,616 A * 2/1986 Kowel .................... G02B 26/06
349/200
6,864,951 B1 * 3/2005 Ren ........................ C09K 19/02
349/13
(Continued)

FOREIGN PATENT DOCUMENTS

CN 201757815 U 3/2011
CN 202421626 U 9/2012
(Continued)

OTHER PUBLICATIONS

Chinese Office Action of Chinese Application No. 201410035834.6, dated Jul. 3, 2015 with English translation.
(Continued)

*Primary Examiner* — Wen-Ying P Chen
(74) *Attorney, Agent, or Firm* — Collard & Rore, P.C.

(57) ABSTRACT

An eyeglass of a 3D glasses, a fabrication method thereof and a 3D glasses are provided. The eyeglass of the 3D glasses comprises: a substrate (2), configured to have a 3D function; and a lens (1) having a converging or diverging function, laminated on the substrate. The eyeglass of the 3D glasses and the 3D glasses have a myopic or hyperopic function simultaneously.

13 Claims, 4 Drawing Sheets

(51) Int. Cl.
| | |
|---|---|
| *G02F 1/1343* | (2006.01) |
| *G02C 7/08* | (2006.01) |
| *B29D 11/00* | (2006.01) |
| *G02B 27/22* | (2006.01) |
| *G02B 27/26* | (2006.01) |
| *G02B 3/14* | (2006.01) |
| *G02F 1/1334* | (2006.01) |
| *G02B 27/01* | (2006.01) |
| *G02F 1/29* | (2006.01) |
| *B29K 101/00* | (2006.01) |
| *B29K 105/00* | (2006.01) |

(52) U.S. Cl.
CPC .. *B29D 11/00413* (2013.01); *B29D 11/00432* (2013.01); *B29D 11/00817* (2013.01); *G02B 27/2207* (2013.01); *G02B 27/2242* (2013.01); *G02B 27/2264* (2013.01); *G02B 27/26* (2013.01); *G02F 1/1334* (2013.01); *B29K 2101/00* (2013.01); *B29K 2105/0079* (2013.01); *G02B 3/14* (2013.01); *G02B 2027/0178* (2013.01); *G02F 1/29* (2013.01); *G02F 2001/13345* (2013.01); *G02F 2001/294* (2013.01); *H04N 2213/008* (2013.01)

(58) Field of Classification Search
CPC .. G02B 2027/0132; G02B 5/30; G02C 7/101; H04N 13/0404; H04N 13/0434; H04N 13/0409; G02F 2001/13345
USPC ...................................................... 349/13, 15
See application file for complete search history.

(56) References Cited

U.S. PATENT DOCUMENTS

| | | | | |
|---|---|---|---|---|
| 2012/0218483 | A1* | 8/2012 | Archambeau | ............ G02B 3/14 349/33 |
| 2014/0098316 | A1* | 4/2014 | You | ....................... G02F 1/1334 349/42 |

FOREIGN PATENT DOCUMENTS

| | | | | |
|---|---|---|---|---|
| CN | 102914898 A | | 2/2013 | |
| CN | 102929384 A | | 2/2013 | |
| CN | 201757815 U | * | 3/2013 | ............ G02B 27/26 |
| CN | 103309074 A | | 9/2013 | |
| CN | 103792671 A | | 5/2014 | |
| CN | 203705725 U | | 7/2014 | |

OTHER PUBLICATIONS

International Search Report with Notice of Transmittal of the International Search Report of PCT/CN2014/078855 in Chinese, dated Nov. 19, 2014.
Written Opinion of the International Searching Authority of PCT/CN2014/078855 in Chinese with English translation dated Nov. 19, 2014.
Second Chinese Office Action of Chinese Application No. 201410035834.6, dated Dec. 29, 2015 with English translation.

* cited by examiner

EYEGLASS OF 3D GLASSES AND FABRICATION METHOD THEREOF, AND 3D GLASSES

CROSS REFERENCE TO RELATED APPLICATIONS

This application is the National Stage of PCT/CN2014/078855 filed on May 29, 2014, which claims priority under 35 U.S.C. §119 of Chinese Application No. 201410035834.6 filed on Jan. 24, 2014, the disclosure of which is incorporated by reference.

TECHNICAL FIELD

Embodiments of the present invention relate to an eyeglass of a 3D glasses, a fabrication method thereof and a 3D glasses.

BACKGROUND

A 3D display technology is to endow a viewer with a stereoscopy by utilizing a binocular stereoscopic vision principle, and its main principle is that, different images having the stereoscopic parallax are received by left and right eyes of the viewer, respectively, and a stereoscopic effect is produced after the images are fused in the brain.

Currently, the 3D display technology mainly has two broad categories: a glasses type and a naked-eye type. For the glasses-type 3D display device, the viewer needs to wear a 3D glasses to experience 3D display. Currently, whichever type of the 3D glasses, whether an chromatic difference type, a polarizing type, a splitting-light type, or a shutter type, cannot be used as myopia glasses or hyperopia glasses simultaneously, so for a viewer who has already worn the myopia glasses or the hyperopia glasses, wearing the 3D glasses will cause certain inconvenience, when he/she is viewing a 3D image displayed by a glasses-type 3D display device. In the prior art, the 3D glasses have been made into a clip-on type accessory structure, which is combined outside an original spectacle frame, but with a poor comfort degree for wearing, and in addition, this method is not applicable to the shutter 3D glasses.

SUMMARY OF THE INVENTION

Embodiments of the present invention provide an eyeglass of a 3D glasses, a fabrication method thereof and a 3D glasses, which can implementing the 3D glasses having a myopic or hyperopic function.

In one aspect, an eyeglass of a 3D glasses provided by an embodiment of the present invention, comprises: a substrate, configured to have a 3D function; and a lens having a converging or diverging function, laminated on the substrate.

Exemplarily, the lens having the converging or diverging function is a polymer-dispersed liquid crystal (PDLC) lens including a PDLC film layer.

In another aspect, an embodiment of the present invention provides a 3D glasses, comprising the eyeglass in any mode as described above.

In a further aspect, an embodiment of the present invention provides a method for fabricating an eyeglass of a 3D glasses, comprising steps of: forming a polymer-dispersed liquid crystal (PDLC) lens having a converging or diverging function and including a PDLC film layer; and bonding a substrate configured to have a 3D function and the PDLC lens to form a laminated structure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention provide an eyeglass of a 3D glasses, a fabrication method thereof and a 3D glasses, wherein the 3D glasses can be used as myopia glasses or hyperopia glasses simultaneously Exemplarily, the eyeglass of the 3D glasses comprises: a substrate configured to have a 3D function and a polymer dispersed liquid crystal (PDLC) lens having a converging function or a diverging function and including a PDLC film layer, arranged in a laminating manner. When the PDLC lens is the one having the converging function, a hypermetrope wearing the glasses having the eyeglass can clearly view a 3D image on a 3D display device. When the PDLC lens is the one having the diverging function, a myope wearing the 3D glasses having the eyeglass can clearly view the 3D image on the 3D display device. Therefore, the eyeglass of the 3D glasses having a function of a myopia eyeglass or a hyperopia eyeglass is achieved.

Here, the polymer dispersed liquid crystal (briefly referred to as PDLC) is made by the following procedures: a low-molecular liquid crystal and a polymeric monomer are mixed, then by undergoing a polymerization reaction under a certain condition, the polymeric monomer forms a micron-scale polymer network and each mesh in the polymer network accommodates a liquid crystal micro-droplet that matches a shape of the mesh. Then, material having electro-optical response characteristics is obtained by using dielectric anisotropy of liquid crystal molecules, without a polarizing plate and an alignment layer. The liquid crystal micro-droplets of different sizes are formed by setting meshes of different sizes in the polymer network, to achieve the eyeglass having a graded refractive index.

Exemplarily, the PDLC lens and the substrate configured to have the 3D function are similar in shape and equal in size. Generally, shapes and sizes of the PDLC lens and the substrate configured to have the 3D function are similar to those of an ordinary eyeglass, which are, for example, circular, oval or irregular in shape.

Exemplarily, the PDLC lens and the substrate configured to have the 3D function may be bonded by Optical Clear Adhesive. The Optical Clear Adhesive (briefly referred to as OCA) is a special adhesive for bonding transparent optical elements, colorless and transparent, with a light transmittance of 90% or more.

The eyeglass of the 3D glasses is the myopia eyeglass or the hyperopia eyeglass with a certain degree, or the eyeglass of the 3D glasses is the myopia eyeglass or the hyperopia eyeglass with an adjustable degree.

The substrate configured to have the 3D function may be any structure for providing a 3D effect, for example, may be a 3D eyeglass of an chromatic difference type, a polarizing type, a splitting-light type, a shutter type, or a narrow-band splitting-light type.

Hereinafter, a technical solution provided by the embodiments of the present invention will be illustrated in conjunction with the accompanying drawings.

A First Embodiment

The first embodiment of the present invention provides a myopia eyeglass or a hyperopia eyeglass with a certain degree and a 3D function.

Figure 1:
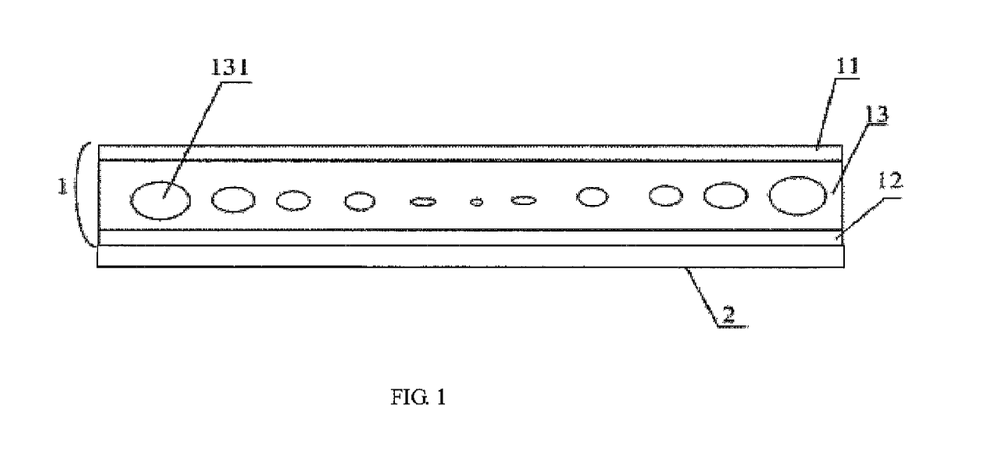
FIG. 1 is a structural schematic diagram of an eyeglass of a 3D glasses provided by a first embodiment of the present invention.

With reference to FIG. 1, FIG. 1 shows a PDLC-based eyeglass of a 3D glasses provided by the embodiment of the present invention, comprising: a substrate 2 configured to have a 3D function and a PDLC lens 1 having a converging function or a diverging function and including a PDLC film, arranged in a laminating manner;

Wherein, the PDLC lens 1 includes: a first transparent substrate 11 and a second transparent substrate 12 disposed opposite to each other, and a PDLC film layer 13 filled between the first transparent substrate 11 and the second transparent substrate 12; the PDLC film layer 13 at least includes a network-like high-molecule polymer, and a liquid crystal micro-droplet 131 located in each mesh of the network-like high-molecule polymer. FIG. 1 is only a schematic diagram, which does not reflect the network-like high-molecule polymer.

Generally, the 3D glasses and a 3D display device are used in coordination; when light from the 3D display device passes through the PDLC lens having diverging function, a myope wearing the 3D glasses can clearly view a 3D image; when light from the 3D display device passes through the PDLC lens having the converging function, a hypermetrope wearing the 3D glasses can clearly view the 3D image.

The PDLC-based eyeglass of the 3D glasses shown in FIG. 1, have the function of the myopia eyeglass or the hyperopia eyeglass simultaneously. The 3D glasses having the eyeglass mounted thereon can solve the problem that the myope or the hypermetrope wearing the ordinary 3D glasses cannot clearly view the 3D image on the 3D display device, it is not necessary to wear the myopia glasses or the hyperopia glasses once wearing the 3D glasses provided by the embodiment of the present invention, which improves an effect of viewing the 3D display picture by a viewer.

When it is necessary to implement the eyeglass having the function of the myopia eyeglass, a concave lens having the diverging function needs to be designed, i.e., with a refractive index close to a center of the eyeglass less than a refractive index far away from the center of the eyeglass. When it is necessary to implement the eyeglass having the function of the hyperopia eyeglass, a convex lens having the converging function needs to be designed, i.e., with a refractive index close to the center of the eyeglass greater than a refractive index far away from the center of the eyeglass.

Figure 2:
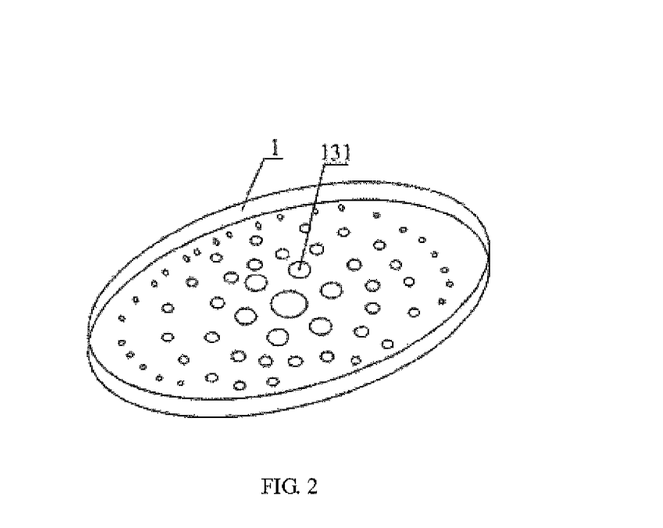
FIG. 2 is a structural schematic diagram of a PDLC lens having a diverging function provided by the first embodiment of the present invention.

With reference to FIG. 2, there is shown the PDLC lens having the diverging function, a diameter of the mesh of the high-molecule polymer close to the center of the PDLC lens is greater than a diameter of the mesh of the high-molecule polymer far away from the center of the PDLC lens; that is to say, a diameter of the liquid crystal micro-droplet 131 close to the center of the PDLC lens 1 is greater than a diameter of the liquid crystal micro-droplet 131 far away from the center of the PDLC lens 1, then the lens formed is the PDLC lens having the diverging function.

Here, the diameter of the liquid crystal micro-droplet 131 close to the center of the PDLC lens 1 is greater, an anchoring effect of the network-like high-molecule polymer on each liquid crystal molecule is weaker, and the liquid crystal molecules in each liquid crystal micro-droplet are arranged regularly, so that it is easy for light to pass through, and the refractive index is lower. The diameter of the liquid crystal micro-droplet 131 far away from the center of the PDLC lens 1 is less, the anchoring effect of the network-like high-molecule polymer on each liquid crystal molecule is stronger, and since orientations of openings of the network-like high-molecule polymer are not exactly the same, the liquid crystal molecules in each liquid crystal micro-droplet incline to a certain extent, so that the light transmittance is poor, and the refractive index is higher. The refractive index in a region of the entire PDLC lens close to the center is less, and the refractive index in a region far away from the center is greater, then the PDLC lens has the diverging function of a concave lens.

Figure 3:
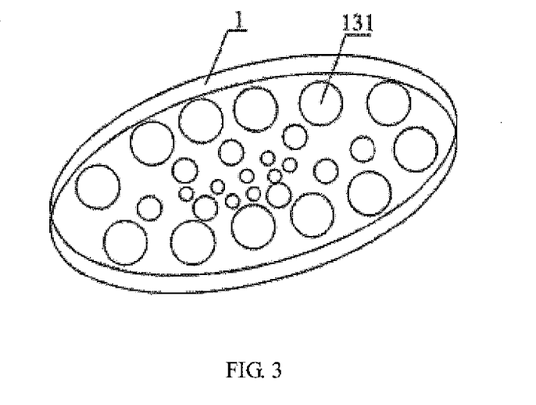
FIG. 3 is a structural schematic diagram of a PDLC lens having a converging function provided by the first embodiment of the present invention.

With reference to FIG. 3, there is shown the PDLC lens having the converging function, the diameter of the mesh of the high-molecule polymer close to the center of the PDLC lens is less than the diameter of the mesh of the high-molecule polymer far away from the center of the PDLC lens; that is to say, the diameter of the liquid crystal micro-droplet 131 close to the center of the PDLC lens 1 is less than the diameter of the liquid crystal micro-droplet 131 far away from the center of the PDLC lens 1, then the lens formed is the PDLC lens having the converging function.

The diameter of the liquid crystal micro-droplet 131 close to the center of the PDLC lens 1 is less, the anchoring effect of the network-like high-molecule polymer on each liquid crystal molecule is stronger, and since the orientations of the openings of the network-like high-molecule polymer are not exactly the same, the liquid crystal molecules in each liquid crystal micro-droplet incline to a certain extent, so that the light transmittance is poor, and the refractive index is higher. The diameter of the liquid crystal micro-droplet 131 far away from the center of the PDLC lens 1 is greater, and the liquid crystal molecules in each liquid crystal micro-droplet are arranged regularly, so that it is easy for light to pass through, and the refractive index is lower. The refractive index in the region of the entire PDLC lens close to the center is greater, and the refractive index in the region far away from the center is less, so as to have the converging function of a convex lens.

The network-like distribution of the high-molecule polymer determines a degree of the PDLC lens.

The network-like form of the high-molecule polymer is obtained by irradiating the polymeric monomer with ultraviolet light. The greater the irradiation intensity of the ultraviolet light, the high the polymerization degree of the polymeric monomer is, the more dense the network of the high-molecule polymer, and the smaller the mesh. Conversely, the less the irradiation intensity of the ultraviolet light, the low the polymerization degree of the polymeric monomer is, the more sparse the network of the high-molecule polymer, and the larger the mesh. Exemplarily, the density of the network of the high-molecule polymer in different regions are controlled by controlling the irradiation intensity of the ultraviolet light in the different regions on the first substrate and the second substrate, to control the degree of the PDLC lens having the converging or diverging function.

Exemplarily, the liquid crystal in the liquid crystal micro-droplet is a nematic liquid crystal. A geometric shape of the nematic liquid crystal molecule is generally rod-shaped, a major axis of the liquid crystal molecule has certain rigidity, and is not apt to bend; and a parallel orderly state is maintained between the molecules along a direction of the major axis. Therefore, the refractive index of the lens including the nematic liquid crystal molecules are at relatively large degree related to a size of the mesh of the network-like high-molecule polymer; when the size of the mesh is smaller, the diameter of the liquid crystal micro-droplet is smaller, the anchoring effect of the high-molecule polymer network on the liquid crystal molecule is stronger, and the shape of the mesh determines inclination degree of the liquid crystal molecule. When the size of the mesh is greater, the diameter of the liquid crystal micro-droplet is greater, the liquid crystal molecules within the liquid crystal micro-droplet are arranged in a parallel orderly manner along the direction of the major axis, and the anchoring effect of the high-molecule polymer network on the liquid crystal molecule is weaker.

Exemplarily, the diameter of the liquid crystal micro-droplet is about 0.1 μm~5 μm.

Exemplarily, a mass concentration of the liquid crystal in the PDLC lens is 30%~40%, e.g., 35%.

The first transparent substrate and the second transparent substrate provided by the embodiment of the present invention may be a glass substrate or a flexible resin film layer, for example, the flexible resin may be polyethylene terephthalate (briefly referred to as PET) with high heat resistance, high flexural strength and low price.

Exemplarily, both the first transparent substrate and the second transparent substrate are the flexible resin film layer, so that the eyeglass of the 3D glasses according to the embodiment of the present invention is thinner and lighter.

Thus, the eyeglass of the 3D glasses provided by the first embodiment of the present invention, without being controlled by an electrical signal, can be directly made into the myopia eyeglass or the hyperopia eyeglass having a specific degree; and if the first transparent substrate and the second transparent substrate are made of base material such as PET, the eyeglass of the 3D glasses obtained thereby will be thinner and lighter.

A Second Embodiment

A technical solution provided by the second embodiment is similar to that provided by the first embodiment, except that the first transparent substrate and the second transparent substrate are respectively provided with a first transparent electrode and a second transparent electrode.

Figure 4:
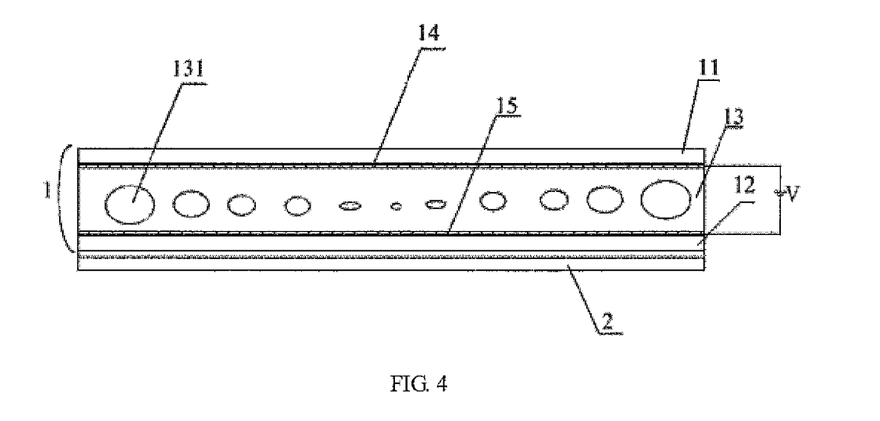
FIG. 4 is a structural schematic diagram of an eyeglass of a 3D glasses provided by a second embodiment of the present invention.

With reference to FIG. 4, the PDLC-based eyeglass of the 3D glasses shown in FIG. 1, further comprises: a first transparent electrode 14 disposed on a side of the first transparent substrate 11 facing the second transparent substrate 12, and a second transparent electrode 15 disposed on a side of the second transparent substrate 12 facing the first transparent substrate 11, the first transparent electrode 14 and the second transparent electrode 15 are configured to form an electric field with a preset intensity between the two when a preset voltage is applied, to control the liquid crystal molecules in the liquid crystal micro-droplet 131 to defect, so as to change the refractive index of the PDLC lens.

The eyeglass of the 3D glasses provided by the second embodiment of the present invention has degree thereof adjustable, for example, fine adjustment of the degree can be implemented.

Larger liquid crystal micro-droplets are formed in a region exposed by weaker ultraviolet light in the PDLC lens, and these larger liquid crystal micro-droplets have a threshold voltage lower than that of the smaller liquid crystal micro-droplets. When a uniform electric field is applied to the lens, since the threshold voltages of the liquid crystal micro-droplets in different regions of the lens are different, the liquid crystal micro-droplets will have different molecular orientations, so that the lens has the refractive index with graded distribution.

By changing a light intensity distribution in a region exposed by the ultraviolet light, a myopia or hyperopia eyeglass with different degrees is achieved, so as to achieve the liquid crystal micro-droplet distribution gradient in an initial state, and to determine the degree of the myopia or hyperopia eyeglass in the initial state.

When the 3D glasses having the function of the myopia or hyperopia eyeglass in the initial state are worn, the degree of the myopia or hyperopia eyeglass in the initial state may be changed by changing an electric field intensity between the first transparent electrode and the second transparent electrode, so as to meet requirements of different wearers.

Figure 5:
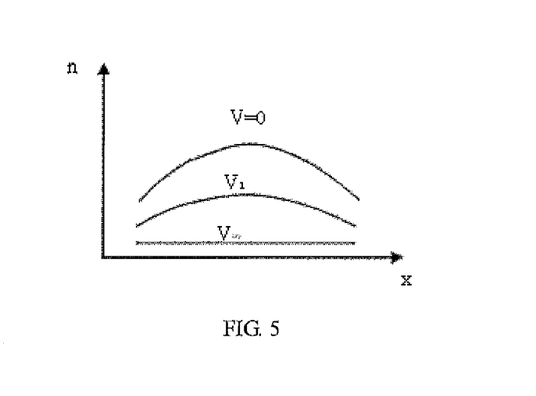
FIG. 5 is a schematic diagram of a refractive index of an eyeglass having a hyperopic function changing with a position of the eyeglass provided by the second embodiment of the present invention.

As shown in FIG. 5: x-axis represents position coordinates from one side of the eyeglass having the hyperopic function to a center of the eyeglass and then to the other side, and y-axis represents refractive index n in different positions of the eyeglass.

The three curves respectively represent the refractive index of the lens when the voltage between the first transparent electrode and the second transparent electrode is V=0, V=V1, and V=∞.

Figure 6:
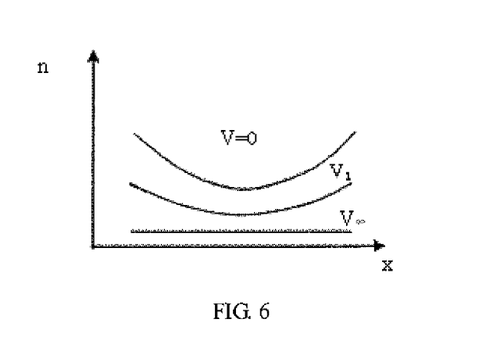
FIG. 6 is a schematic diagram of a refractive index of an eyeglass having a myopic function changing with a position of the eyeglass provided by the second embodiment of the present invention.

As shown in FIG. 6: x-axis represents position coordinates from one side of the eyeglass having the myopia function to a center of the eyeglass and then to the other side, and y-axis represents refractive index n in different positions of the eyeglass.

The three curves respectively represent the refractive index of the lens when the voltage between the first transparent electrode and the second transparent electrode is V=0, V=V1, and V=∞.

The liquid crystal micro-droplets at different x coordinate values are different in size, surface interactions on the liquid crystal micro-droplets wrapped by the polymer are also different, dielectric and viscosity properties of the liquid crystal and the polymer, the size of the liquid crystal micro-droplet and a thickness of the device determine a driving voltage of the PDLL, and the driving voltage is inversely proportional to the size of the liquid crystal micro-droplet, so the liquid crystal micro-droplet is driven differently by the voltage at different positions under the same electric field, which manifests different changes of the refractive index.

For the refractive index in the initial state of V=0, due to different sizes of the liquid crystal micro-droplets, the surface interactions of the polymer on the liquid crystal micro-droplets are different; the smaller the liquid crystal micro-droplet, the stronger the anchoring force of the polymer on the liquid crystal, the higher the threshold voltage, and the larger the liquid crystal micro-droplet, and the weaker the anchoring force of the polymer on the liquid crystal. Therefore, an equivalent refractive index in a region where the liquid crystal micro-droplets are relatively small will be higher, and a refractive index distribution curve in a non-electric field state is formed. The hyperopia eyeglass corresponds to a convex lens, which plays a role in converging light, corresponding to FIG. 5; and the myopia eyeglass corresponds to a concave lens, which plays a role in diverging light, corresponding to FIG. 6.

In a case of the myopia or hyperopia eyeglass with a specific degree, as shown in FIG. 1, it is not necessary to dispose the first transparent electrode and the second transparent electrode, the PDLC lens is directly bonded onto the 3D eyeglass, so that the structure is lighter and thinner; with simpler fabrication process and lower cost.

Figure 7:
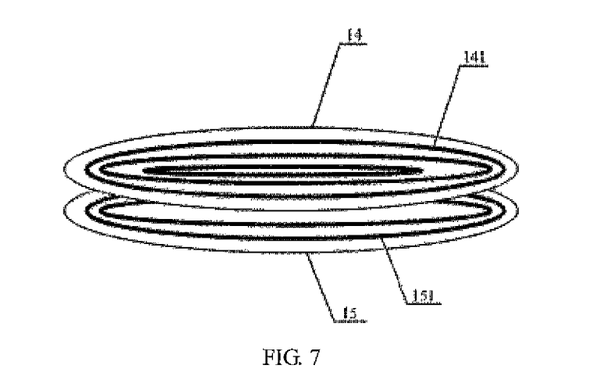
FIG. 7 is a structural schematic diagram of arranging a first transparent electrode and a second transparent electrode in the eyeglass provided by the second embodiment of the present invention.

With reference to FIG. 7, on the basis of the eyeglass shown in FIG. 4, the first transparent electrode 14 disposed on the first transparent substrate 11 includes a plurality of annular electrodes 141 having a same center; and the second transparent electrode 15 disposed on the second transparent substrate 12 includes a plurality of annular electrodes 151 having a same center; the annular electrodes in the first transparent electrode 14 and the annular electrodes 151 in the second transparent electrode 15 are disposed opposite to each other.

In the eyeglass shown in FIG. 7, the 3D eyeglass with degree adjustable may be achieved by providing the first transparent electrode and the second transparent electrode.

Exemplarily, the same one eyeglass may also be made to have the myopic and the hyperopic function in different situations. In addition, the eyeglass of the 3D glasses having the myopic or hyperopic function with higher accuracy can be further achieved.

The structures shown in FIG. 2 and FIG. 3 provided by the first embodiment of the present invention are applicable to the second embodiment, and the diameter, the concentration and other related parameters of the liquid crystal micro-droplet are all applicable to the second embodiment. The material layers of the first transparent substrate and the second transparent substrate are both applicable to the second embodiment, which will not be repeated here.

The first transparent electrode and the second transparent electrode according to an embodiment of the present invention may be made of indium tin oxide (ITO) or indium zinc oxide (IZO) or conductive nano-material, etc., which will not be specifically limited here.

An embodiment of the present invention further provides a 3D glasses, comprising the eyeglass according to any one of the above-described embodiments. When the eyeglass comprises the substrate configured to have the 3D function and the PDLC lens having the converging function and including the PDLC film layer, a hypermetrope wearing the 3D glasses having the eyeglass can clearly view a 3D image on a 3D display device. When the eyeglass comprises the substrate configured to have the 3D function and the PDLC lens having the diverging function and including the PDLC film layer, a myope wearing the 3D glasses having the eyeglass can clearly view the 3D image on the 3D display device. The eyeglass of the 3D glasses having the myopic or hyperopic function is achieved.

When the eyeglass comprises a first transparent electrode and a second transparent electrode, a myopia or hyperopia degree of the eyeglass is adjustable. The eyeglass of the 3D glasses and the 3D glasses having the myopic or hyperopic function and degree adjustable are achieved.

Hereinafter, a fabrication method of an eyeglass provided by an embodiment of the present invention will be illustrated exemplarily, the eyeglass being the eyeglass in any of the above modes.

The method for fabricating a PDLC-based eyeglass of the 3D glasses comprises steps of:

S11: forming a PDLC lens having a converging or diverging function and including a PDLC film layer;

S12: bonding a substrate configured to have a 3D function and the PDLC lens to form a laminated structure.

The substrate configured to have the 3D function and the PDLC lens are bonded together by Optical Clear Adhesive, the Optical Clear Adhesive being that mentioned in the first embodiment.

For the eyeglass provided by the first embodiment, the step S11 of forming a PDLC lens having a converging or diverging function and including a PDLC film layer, includes: forming a mixture by uniformly mix at least polymeric monomers and liquid crystal molecules in a dark room; heating the mixture to an isotropic state, injecting the mixture into a cell constituted by a first transparent substrate and a second transparent substrate disposed opposite to each other, to form an initial PDLC lens; performing an ultraviolet exposing process on the initial PDLC lens by using a mask, so that the polymeric monomers form a network-like high-molecule polymer, each mesh of the network-like high-molecule polymer accommodating a liquid crystal micro-droplet, thus, after the exposing process, the initial PDLC lens is formed as the PDLC lens having the converging or diverging function.

Exemplarily, the performing an ultraviolet exposing process on the initial PDLC lens by using a mask, to form the PDLC lens having the converging function, includes: performing the ultraviolet exposing process on the initial PDLC lens by using a mask with a light transmittance decreasing progressively from a center to an edge, to form the high-molecule polymer with a mesh diameter increasing progressively from a center to an edge.

Exemplarily, the performing an ultraviolet exposing process on the initial PDLC lens by using a mask, to form the PDLC lens having the diverging function, includes: performing the ultraviolet exposing process on the initial PDLC lens by using a mask with a light transmittance increasing progressively from a center to an edge, to form the high-molecule polymer with a mesh diameter decreasing progressively from a center to an edge.

Exemplarily, the mask with graded light transmittance from the center to the edge refers to that a plurality of annular light-transmission regions having a same center are distributed from the center to the edge, each light-transmission region having a different light transmittance, and the light transmittance becomes greater or less with a distance farther and farther away from the center, which may be achieved by using a Half-tone Mask. The ultraviolet light having a uniform light intensity irradiates the mixture at least including the polymeric monomers and the liquid crystal molecules through the mask having the regions of different light transmittances, so that the meshes of the high-molecule polymer within the PDLC film layer are different in size, to form droplets with particle sizes which is gradually changed from 0.1 μm to 5 μm, the droplets being arranged from small to large or from large to small from the center to the edge, respectively corresponding to the myopia eyeglass and the hyperopia eyeglass.

Exemplarily, a mass concentration of the liquid crystal in the mixture may be 30%~40%, for example, 35%.

Exemplarily, a mixture including the polymeric monomers, nematic liquid crystal, a photo-initiator, a crosslinking agent and an assistant initiator is mixed uniformly in the dark room; wherein a mass concentration of the nematic liquid crystal in the mixture is 30%~40%. Exemplarily, the assistant initiator here may be referred to as a co-initiator, which may be, for example, methyl diethanolamine, triethanolamine, 4-(dimethylamino)ethyl benzoate or 4-(dimethylamino) n-butoxy ethyl benzoate.

The polymeric monomer is, for example, NOA81. The polymeric monomer produces a polymer network before phase separation, and can form the liquid crystal micro-droplets with different average diameters ranging from 0.1 μm~5 μm.

For the eyeglass provided by the second embodiment, before the heating the mixture to an isotropic state, injecting the mixture into a cell constituted by a first transparent substrate and a second transparent substrate disposed opposite to each other, the step further includes:

forming a first transparent electrode on a side of the first transparent substrate facing the second transparent substrate, and forming a second transparent electrode on a side of the second transparent substrate facing the first transparent substrate, the first transparent electrode and the second transparent electrode being configured to form an electric field with a preset intensity when a preset voltage is applied, to control the liquid crystal molecules in the liquid crystal micro-droplet in the PDLC film layer to defect, so as to change the refractive index of the PDLC film layer.

Exemplarily, a plurality of annular electrodes having a same center are formed on the side of the first transparent substrate facing the second transparent substrate; a plurality of annular electrodes having a same center are formed on the side of the second transparent substrate facing the first transparent substrate; and the annular electrodes in the first transparent electrode and the annular electrodes in the second transparent electrode are disposed opposite to each other.

Figure 8:
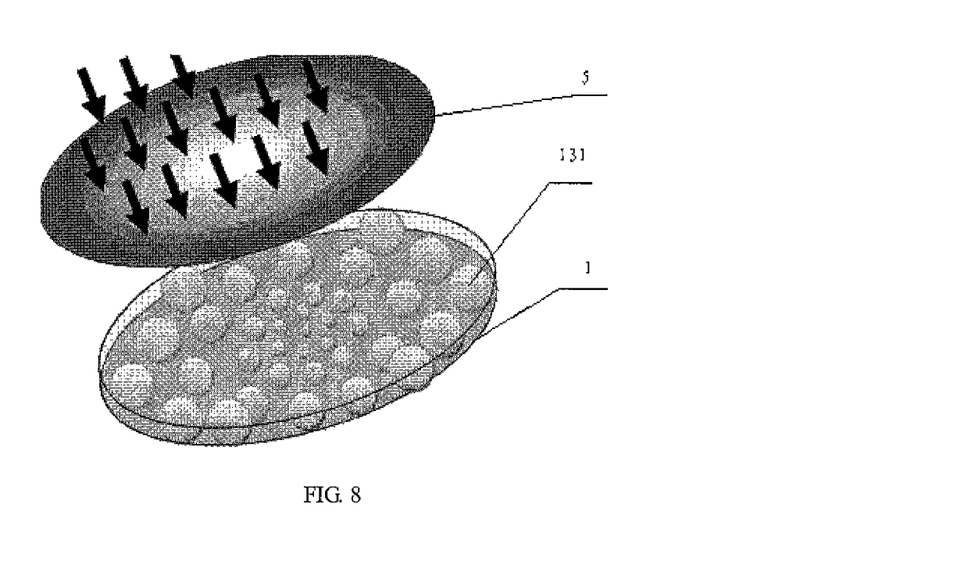
FIG. 8 is a schematic diagram of performing an ultraviolet exposing process on an initial PDLC lens by using a mask provided by an embodiment of the present invention.
Figure 9:
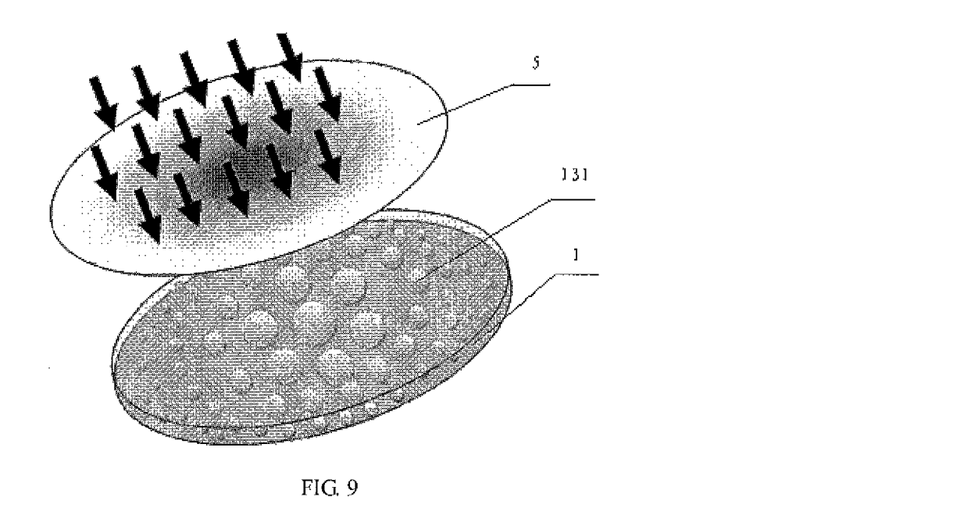
FIG. 9 is another schematic diagram of performing an ultraviolet exposing process on an initial PDLC lens by using a mask provided by an embodiment of the present invention.

Further, the performing an ultraviolet exposing process on the initial PDLC lens by using a mask, whether for the eyeglass provided by the first embodiment or the eyeglass provided by the second embodiment, includes:

With reference to FIG. 8 and FIG. 9, the ultraviolet exposing process is performed on the initial PDLC lens 1, by using a mask 5 with the light transmittance of a certain gradient from a center to an edge, arrowed lines in FIG. 8 and FIG. 9 indicating the ultraviolet light during exposure.

When the light transmittance of the mask 5 decreases progressively from the center to the edge, a diameter of a network-like structure of the network-like high-molecule polymer gradually becomes greater from the center to the edge, a diameter of the liquid crystal micro-droplet 131 distributed in the high-molecule polymer gradually becomes greater from the center to the edge, and the exposed initial PDLC lens forms a PDLC lens having the converging function; as shown in FIG. 8.

When the light transmittance of the mask 5 increases progressively from the center to the edge, the diameter of the network-like structure of the network-like high-molecule polymer gradually becomes less from the center to the edge, the diameter of the liquid crystal micro-droplet 131 distributed in the high-molecule polymer gradually becomes less from the center to the edge, and the exposed initial PDLC lens forms a PDLC lens having the diverging function; as shown in FIG. 9.

By using the eyeglass of the 3D glasses and the fabrication method thereof provided by the embodiments of the present invention with a simple structure and a simple fabrication process, the 3D myopia or hyperopia eyeglass of low cost can be achieved and the degree-adjustable 3D myopia or hyperopia eyeglass can also be achieved. Thereby, the 3D glasses having a certain degree or adjustable degree can be achieved. The myope or the hypermetrope wearing the glasses having the eyeglass can clearly view the 3D image on the 3D display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201410035834.6 filed on Jan. 24, 2014, the disclosure of which is incorporated herein by reference in its entirety as part of the present application.

What is claimed is:
1. An eyeglass of a 3D glasses, comprising:
 a substrate, configured to have a 3D function;
 a lens having a converging or diverging function, laminated on the substrate;
 wherein the lens having the converging or diverging function is a polymer-dispersed liquid crystal (PDLC) lens including a PDLC film layer;
 wherein the PDLC lens comprises:
  i) a first transparent substrate;
  ii) a second transparent substrate, disposed opposite to the first transparent substrate;
  wherein the PDLC film layer, is filled between the first transparent substrate and the second transparent substrate, and wherein the PDLC film layer at least comprises a network-like high-molecule polymer and a liquid crystal micro-droplet located in each mesh of the network-like high-molecule polymer;
 wherein the PDLC lens further comprises
  i) a first transparent electrode which is disposed on a side of the first transparent substrate facing the second transparent substrate and comprises a plurality of first annular electrodes having a same center; and ii) a second transparent electrode which is disposed on a side of the second transparent substrate facing the first transparent substrate and comprises a plurality of second annular electrodes having a same center; and the first annular electrodes and the second annular electrodes are disposed opposite to each other, wherein the first transparent electrode and the second transparent electrode are configured to produce a uniform electric field therebetween.

2. The eyeglass according to claim 1, wherein in the PDLC film layer of the PDLC lens having the converging function, a diameter of the mesh of the high-molecule polymer close to a center of the PDLC lens is less than a diameter of the mesh of the high-molecule polymer far away from the center of the PDLC lens.

3. The eyeglass according to claim 1, wherein in the PDLC film layer of the PDLC lens having the diverging function, a diameter of the mesh of the high-molecule polymer close to the center of the PDLC lens is greater than a diameter of the mesh of the high-molecule polymer far away from the center of the PDLC lens.

4. The eyeglass according to claim 1, wherein the liquid crystal micro-droplet is a nematic liquid crystal micro-droplet.

5. The eyeglass according to claim 1, wherein a diameter of the liquid crystal micro-droplet is 0.1 μm~5 μm.

6. The eyeglass according to claim 1, wherein a mass concentration of liquid crystal in the PDLC film layer is 30%~40%.

7. The eyeglass according to claim 1, wherein the PDLC lens and the substrate configured to have the 3D function are similar in shape and equal in size.

8. The eyeglass according to claim 1, wherein the PDLC lens and the substrate configured to have the 3D function are bonded by Optical Clear Adhesive.

9. The eyeglass according to claim 1, wherein the substrate configured to have the 3D function is an eyeglass of a polarizing 3D glasses, an eyeglass of an active shutter 3D glasses, an eyeglass of a chromatic difference 3D glasses, an eyeglass of a splitting-light 3D glasses, or an eyeglass of a narrow-band splitting-light 3D glasses.

10. A 3D glasses, comprising the eyeglass according to claim 1.

11. A method for fabricating an eyeglass of a 3D glasses, comprising steps of:
forming a polymer-dispersed liquid crystal (PDLC) lens having a converging or diverging function and including a PDLC film layer;
bonding the PDLC lens and a substrate configured to have a 3D function to form a laminated structure;
wherein the step of forming a PDLC lens having a converging or diverging function and including a PDLC film layer, comprises:
i) uniformly mixing at least polymeric monomers and liquid crystal molecules to form a mixture in a dark room;
ii) heating the mixture to an isotropic state, injecting the mixture into a cell constituted by a first transparent substrate and a second transparent substrate disposed opposite to each other, to form an initial PDLC lens;
performing an ultraviolet exposing process on the initial PDLC lens by using a mask, so that the polymeric monomers form a network-like high-molecule polymer, each mesh of the network-like high-molecule polymer accommodating a liquid crystal micro-droplet, so that the exposed initial PDLC lens forms the PDLC lens having the converging or diverging function;
wherein before the step of heating the mixture to an isotropic state, the process includes the step of injecting the mixture into a cell constituted by a first transparent substrate and a second transparent substrate disposed opposite to each other, the step further comprises:
i) forming a first transparent electrode on a side of the first transparent substrate facing the second transparent substrate comprising forming a plurality of first annular electrodes having a same center on the side of the first transparent substrate facing the second transparent substrate, and
ii) forming a second transparent electrode on a side of the second transparent substrate facing the first transparent substrate comprising forming a plurality of second annular electrodes having a same center on the side of the second transparent substrate facing the first transparent substrate; the first annular electrodes and the second annular electrodes being disposed opposite to each other, wherein the first transparent electrode and the second transparent electrode are configured to produce a uniform electric field therebetween.

12. The method according to claim 11, wherein, the performing an ultraviolet exposing process on the initial PDLC lens by using a mask, to form the PDLC lens having the converging function, comprises: performing the ultraviolet exposing process on the initial PDLC lens by using a mask with a light transmittance decreasing progressively from a center to an edge, to form the high-molecule polymer with a mesh diameter increasing progressively from a center to an edge;
the performing an ultraviolet exposing process on the initial PDLC lens by using a mask, to form the PDLC lens having the diverging function, comprises: performing the ultraviolet exposing process on the initial PDLC lens by using a mask with a light transmittance increasing progressively from a center to an edge, to form the high-molecule polymer with a mesh diameter decreasing progressively from a center to an edge.

13. The method according to claim 11, wherein the uniformly mixing at least polymeric monomers and liquid crystal molecules to form a mixture in a dark room, comprises:
uniformly mixing the polymeric monomers, a nematic liquid crystal, a photo-initiator, a crosslinking agent and a co-initiator in the dark room to form the mixture, wherein a mass concentration of the nematic liquid crystal in the mixture is 30%~40%.

* * * * *